United States Patent [19]

Wenz

[11] Patent Number: 5,389,175

[45] Date of Patent: Feb. 14, 1995

[54] METHOD OF MANUFACTURING A PLEATED FILTER MATERIAL

[75] Inventor: Berthold Wenz, Sachsenheim, Germany

[73] Assignee: Filterwerk Mann & Hummel GmbH, Ludwigsburg, Germany

[21] Appl. No.: 92,429

[22] Filed: Jul. 16, 1993

[30] Foreign Application Priority Data

Jul. 18, 1992 [DE] Germany ............................ 4243723

[51] Int. Cl.6 .............................................. B31F 1/00
[52] U.S. Cl. .................................... 156/204; 156/207; 156/272.2; 493/347
[58] Field of Search ............ 156/204, 474, 207, 272.2; 210/493.5; 493/416, 417, 422, 423, 424, 441, 346, 347, 359, 381, 382, 401, 402, 403, 410, 463, 941

[56] References Cited

U.S. PATENT DOCUMENTS

| 3,321,345 | 5/1967 | Duncan | 156/204 |
| 4,798,575 | 1/1989 | Siversson | 156/474 |

FOREIGN PATENT DOCUMENTS

| 0260267 | 3/1988 | European Pat. Off. |
| 2523424 | 11/1976 | Germany |
| 8908176 | 8/1989 | Germany |
| 2209354 | 5/1989 | United Kingdom |
| 86/07580 | 12/1986 | WIPO |

Primary Examiner—Caleb Weston
Assistant Examiner—Richard Crispino
Attorney, Agent, or Firm—Evenson, McKeown, Edwards & Lenahan

[57] ABSTRACT

A method and apparatus for the manufacture of a pleated filter from an endless web of filter material scores a web of filter material scored in a scoring station. The web of filter material is then passed with a set pleat spacing into cogbelts. The filter material web is then severed by a cutter into pieces suitable for further processing.

11 Claims, 5 Drawing Sheets

METHOD OF MANUFACTURING A PLEATED FILTER MATERIAL

BACKGROUND OF THE INVENTION

The present invention relates to a method and an apparatus for manufacturing a filter from an endless web of filter material.

A method of this kind is disclosed in European Patent 260,267 and an apparatus of this kind is disclosed in German Patent 25 23 424, for the manufacture of air filter inserts, for example.

A disadvantage of manufacturing filter inserts by the method described in European Patent 260,267 is that, after the pleating of the filter material, the filter material is loose as it enters the screw, which is a comb-like part intended to define the projections. This loose transfer can result in damage to the filter material and cause leaks in it.

It is possible, as described in German Patent 25 23 424, to convey the pleated filter material into the screw by means of a complicated drive mechanism. This is, however, very expensive, and would increase the cost of the method and with it the cost of the end product. It furthermore calls for a greater cost of assembly and complicated adjustment in operation.

SUMMARY OF THE INVENTION

It is thus an object of the invention to create a method and an apparatus by which a simple, inexpensive and reliable manufacture of non-leaking filter inserts can succeed.

It is also an object of the invention to provide a method and apparatus whereby a filter web is produced such that after the web of material has been scored, fixation of pleats is provided so as to shape the filter material without damaging it.

Another object of the invention is to provide a method and apparatus for producing a filter material web in which the pleated web of filter material is seamlessly transferred from a cogbelt, so that the filter material web is carried without interruption.

It is a further object of the invention to provide an apparatus in which a cogbelt is followed overlapping by at least one helix such that the pleated web of filter material will be carried through without interruption.

It is a still further object of the invention to provide an apparatus which provides dense filter inserts.

These and other objects are achieved by the present invention which provides a method for the manufacture of a pleated filter from an endless web of filter material, this method comprising the steps of scoring the filter material web, and introducing the filter material web between at least two cogbelts spaced apart from one another and disposed above and below the filter material web and running with the filter material web. The cogbelts subsequently pleat the filter material web according to the scoring.

The objects are also achieved by an apparatus constructed in accordance with the present invention which provides an apparatus for producing a pleated filter from an endless filter material web, comprising a scoring station that prepares the filter material web for pleating, a pleating station following the scoring station, and at least two cogbelts spaced apart from one another and disposed above and below the filter material web and running alongside the filter material web.

It is an important advantage of the method according to the present invention that, after the web of filter material has been scored, at least two cogbelts running lengthwise of the web of filter material provide both for the pleating and for keeping the pleats a fixed distance apart. Such fixation of the pleats makes it possible to shape the filter material without damaging it.

An advantageous embodiment of the invention provides that, by means of at least one helix, the pleated web of filter material is transferred from the cogbelt seamlessly, i.e., with a slight overlap, so that the filter material web is carried without interruption.

In certain embodiments of the invention, the apparatus includes a cogbelt that is followed overlappingly by at least one helix such that the pleated web of filter material will be carried through without interruption.

Certain advantageous embodiments of the invention provide that the lateral edges of the pleated filter material web are combined, by a frequency generator and/or with the aid of a press, with lateral strips so as to form dense filter inserts.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
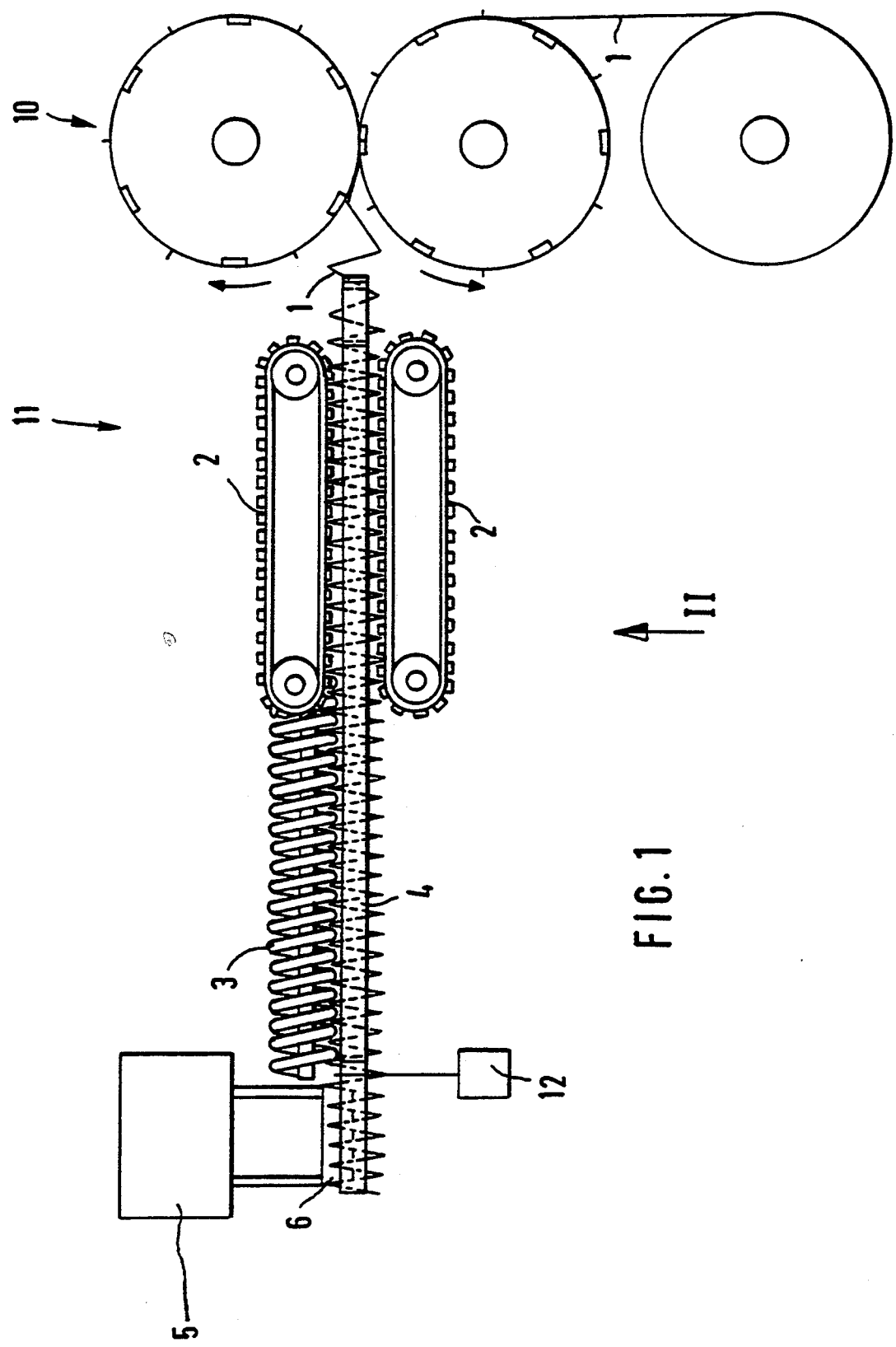
FIG. 1 shows an apparatus, constructed in accordance with an embodiment of the present invention, for manufacturing a filter.

In the illustrated embodiments of the invention, an endless web of filter material 1 is first scored in a scoring station 10. From there the filter material web 1 passes into the range of the influence of a pleating station 11, or more precisely between two cogbelts 2 which pleat the scored filter material web 1 with a fixed spacing of the pleats. After the cogbelts 2 the pleated filter material 1 continues, still with the fixed spacing of the pleats, into a helix 3. This helix 3 is easily exchangeable and can have a variable pitch. Before the pleated filter is taken out by foam grippers 7 (see FIG. 2) it is severed from the filter material web 1 by a cutter 12.

In the embodiment of FIG. 1, the filter material web 1 runs between spacing belts 4 so that a properly spaced guidance of the pleated filter material web 1 is assured from its entry into the cogbelts 2 until its removal by the comb-like elements 6 of the transfer station 5.

Figure 2:
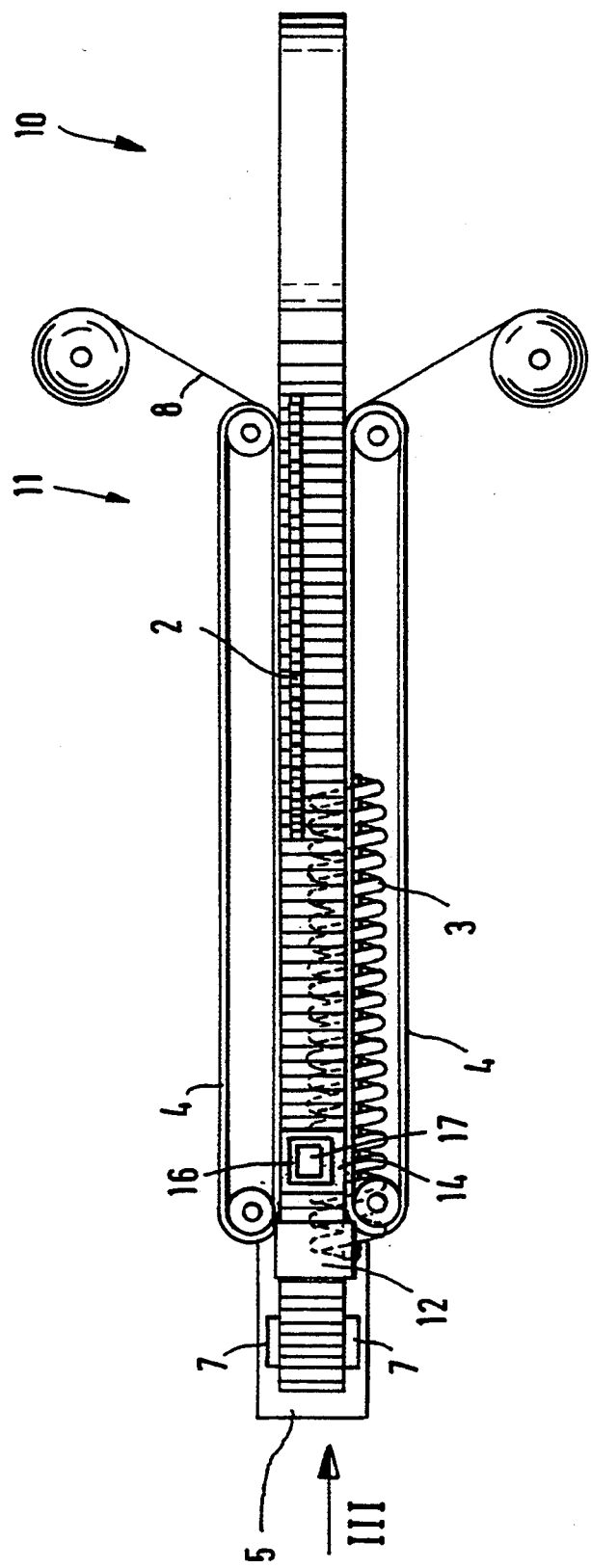
FIG. 2 illustrates another embodiment of the present invention, but is shown with a view in the direction of arrow II of FIG. 1.
Figure 3:
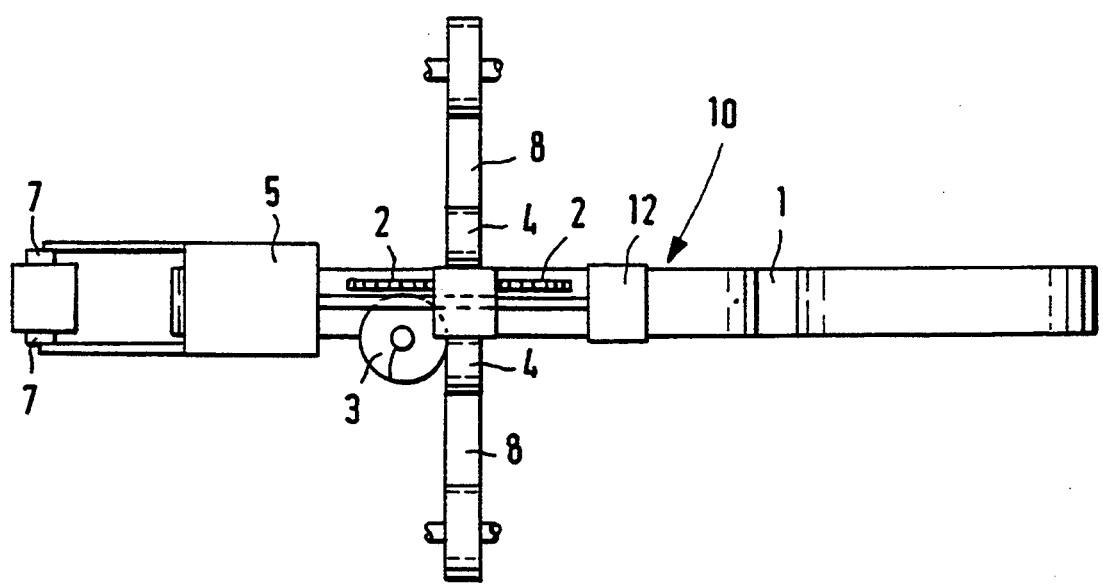
FIG. 3 illustrates an end view of the embodiment of FIG. 2 in the direction of arrow III.

In the embodiment illustrated in FIG. 2, a strip 8 is joined to the filter material web 1 by a joining station 14. This joining (or "assembling") station 14 includes a frequency generator 16 and a press 17. In this embodiment, the transfer station 5 is assisted by foam grippers 7 rather than the comb-like elements 6 of the embodiment of FIG. 1. The combining of the lateral strips 8 with the lateral edges of the pleated filter material web 1 will form dense filter inserts.

Figure 4:
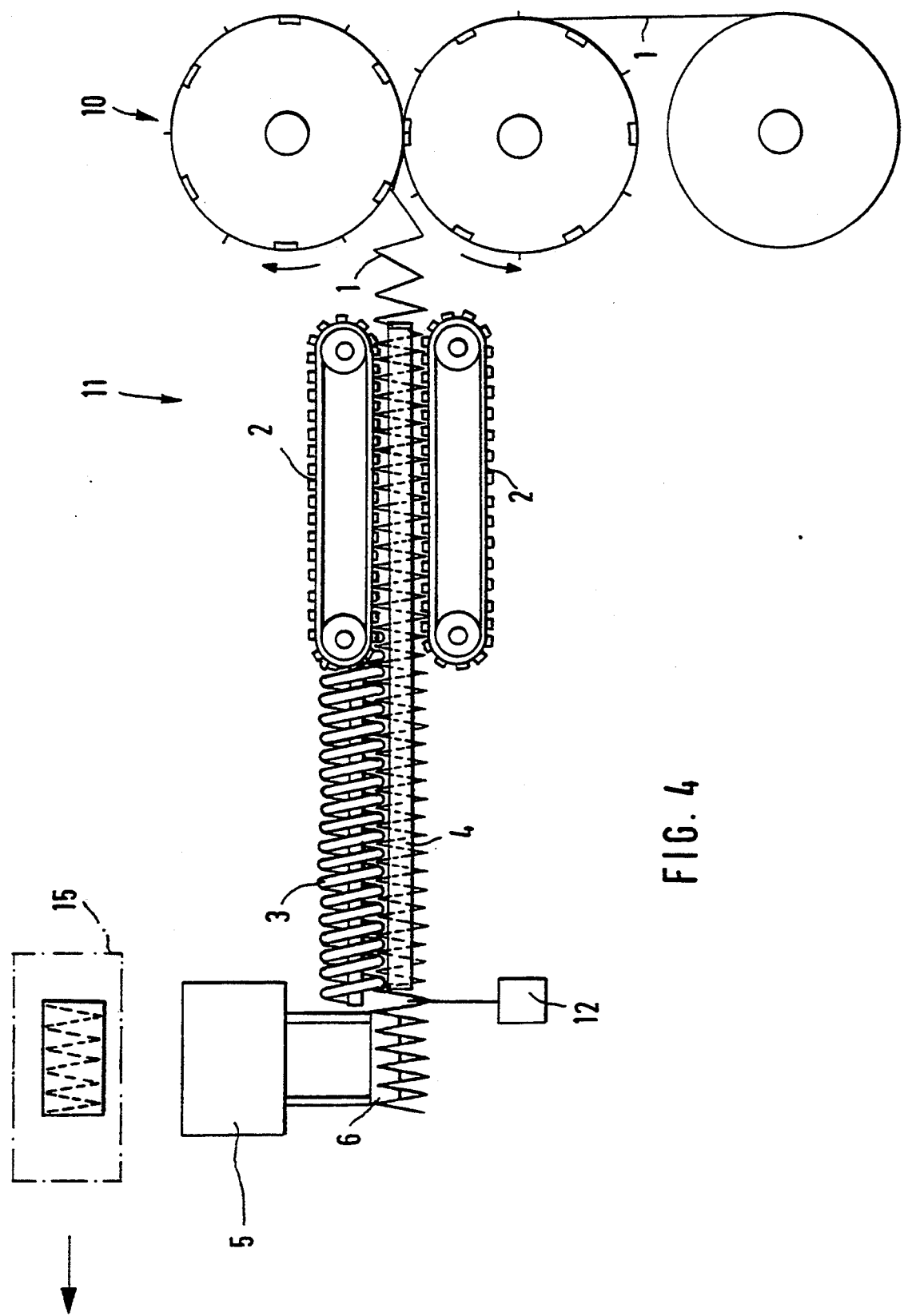
FIG. 4 shows a further embodiment of the present invention.

In the embodiment of the invention shown in FIG. 4, the transfer station 5 is assisted by the comb-like elements 6. These comb-like elements 6 take the pleated filter material web 1 out of the reach of the helix 3, so that the filter material web 1 cannot assume a random pleat spacing. When the comb-like elements 6 have arrived with the filter material web 1 at the correct point, then the cutter 12 performs a cutting operation. The transfer station 5 passes the piece of filter material web 1, held by the comb-like elements 6 in the set pleat spacing, into the injection molding station 15 in which the piece of filter material web 1 is injection molded in plastic.

Figure 5:
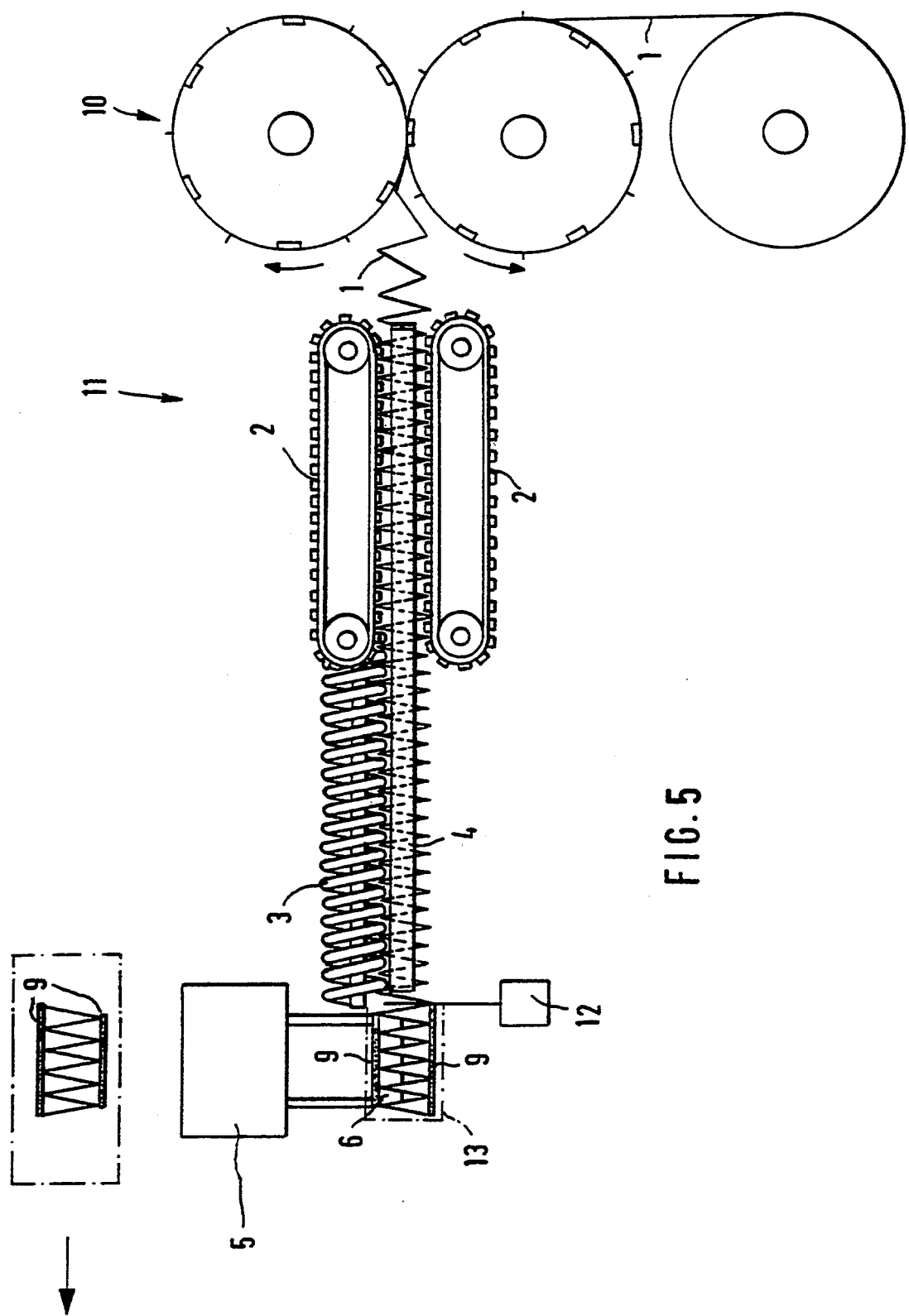
FIG. 5 illustrates a still further embodiment of the present invention.

The embodiment of the present invention shown in FIG. 5 differs from that-shown in FIG. 4 in that a gluing station 13 is added, which applies beads of glue 9 to the filter material web 1. These beads of glue 9 can serve both for strengthening and for sealing around the filter.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for the manufacture of a pleated filter material web from an endless web of filter material, comprising:

scoring the filter material web;

introducing the filter material web between at least two cogbelts spaced apart from one another and disposed above and below the filter material web and running with the filter web, the cogbelts subsequently pleating the filter material web according to the scoring; and advancing the pleated filter material with a defined distance between pleats by at least one helix adjoining the cogbelts.

2. A method according to claim 1, further comprising guiding the pleated filter material web with at least two spacing belts that run lengthwise of the filter material web.

3. A method according to claim 2, further comprising severing the filter material web which has been scored, pleated and advanced so as to allow transfer of the severed filter material web from the endless web.

4. A method according to claim 3, further comprising removing the severed filter material web from the endless web by a transfer device.

5. A method according to claim 4, wherein the step of removing the filter material web from the endless web by a transfer device includes operating the transfer device with comb shaped elements.

6. A method according to claim 4, wherein the step of removing the filter material web from the endless web by a transfer device includes operating the transfer device with grippers having foam elements.

7. A method according to claim 4, further comprising directly encasing lateral edges of the filter material web in plastic after the filter material web has been pleated.

8. A method according to claim 4, further comprising applying a bead of glue to the filter material web in a glue station after the filter material web has been pleated.

9. A method according to claim 4, further comprising combining a strip with edges of the filter material web after the filter material web has been pleated.

10. A method according to claim 9, wherein the step of combining includes combining the strip with the filter material web by application of high frequencies.

11. A method according to claim 9, wherein the step of combining includes combining the strip with the filter material web by application of pressure.

* * * * *